United States Patent [19]

Ishimaru

[11] Patent Number: 5,057,859
[45] Date of Patent: Oct. 15, 1991

[54] CAMERA HAVING HIGH-PRECISION STOP FUNCTION FOR MOVABLE UNIT

[75] Inventor: Toshiaki Ishimaru, Hachioji, Japan

[73] Assignee: Olympus Optical Co., Ltd., Tokyo, Japan

[21] Appl. No.: 617,351

[22] Filed: Nov. 23, 1990

[51] Int. Cl.$^5$ .............................................. G03B 3/10
[52] U.S. Cl. ................... 354/400; 354/173.1; 354/195.1; 318/685
[58] Field of Search ............... 354/400, 173.1, 173.11, 354/195.1; 318/685

[56]  References Cited
U.S. PATENT DOCUMENTS
4,878,077 10/1989 Maeno et al. ................... 354/400

FOREIGN PATENT DOCUMENTS
63-153526 6/1988 Japan .

Primary Examiner—Michael L. Gellner
Attorney, Agent, or Firm—Frishauf, Holtz, Goodman & Woodward

[57] ABSTRACT

A camera includes a movable unit. A motor drives the movable unit. A memory stores a drive target position of the movable unit. A pulse generator generates pulses according to a movement of the movable unit. A first detector detects the remaining number of pulses up to a target position on the basis of the number of generated pulses, and the drive target position. A second detector detects a moving speed of the movable unit on the basis of an interval of the generated pulses. Based on the detected moving speed, a prediction circuit predicts the number of pulses which will be generated by the pulse generator until the movable unit is stopped when the motor is in an open state. A calculation circuit calculates a difference between the predicted number of pulses and the remaining number of pulses. A controller controls the motor by selecting, based on the difference, one of a motor ON mode for applying a power supply voltage to the motor, a motor open mode for applying no power supply voltage to the motor to drive it by inertia, and a motor brake mode for short-circuiting the motor to brake it.

38 Claims, 10 Drawing Sheets

| PREVIOUS VALUE | | PRESENT VALUE | | SIGN OF REMAINING PULSE | INCREASE DECREASE IN COUNT VALUE |
|---|---|---|---|---|---|
| FIRST | SECOND | FIRST | SECOND | | |
| 0 | 0 | 0 | 0 | ╱ | 0 |
| | | | 1 | | −1 |
| | | 1 | 0 | | +1 |
| | | 1 | 1 | ± | +2 |
| | | | | = | −2 |
| 0 | 1 | 0 | 0 | ╱ | +1 |
| | | | 1 | | 0 |
| | | 1 | 0 | + | +2 |
| | | 1 | 1 | − | −2 |
| | | | | | −1 |
| 1 | 0 | 0 | 0 | ╱ | −1 |
| | | | 1 | + | +2 |
| | | | | − | −2 |
| | | 1 | 0 | ╱ | 0 |
| | | 1 | 1 | + | +1 |
| | | | | | +2 |
| 1 | 1 | 0 | 0 | − | −2 |
| | | | 1 | | +1 |
| | | 1 | 0 | ╱ | −1 |
| | | 1 | 1 | | 0 |

CAMERA HAVING HIGH-PRECISION STOP FUNCTION FOR MOVABLE UNIT

BACKGROUND OF THE INVENTION

1. Field of the Invention

The present invention relates to a camera having a movable unit of, e.g., a lens moved to a target position according to a drive operation of a motor, and, more particularly, to a camera moving amount control apparatus for precisely stopping a movable unit at a target position.

2. Description of the Related Art

For an auto-focusing apparatus as a moving amount control apparatus for driving a photographing lens and stopping it at an in-focus position, a method proposed in, e.g., Published Unexamined Japanese Patent Application No. 63-153526 is known. In this method, information representing an optimal deceleration curve of the photographing lens is stored in a storage means, a moving speed of the photographing lens is detected by a detection means, and the detected moving speed is sequentially compared with the information representing the deceleration curve stored in the storage means, thereby turning on/off or braking a motor to control an acceleration/deceleration operation. With these operations, the photographing lens is decelerated to the in-focus position along the deceleration curve, and is precisely stopped at a target position.

However, when the deceleration control of the photographing lens is performed by this method, the motor must be turned on to accelerate the photographing lens when the photographing lens comes close to the infocus position. In this case, the photographing lens tends to overshoot the target position. In order to avoid such a state, the above-mentioned auto-focusing apparatus employs a limited acceleration method for limiting an ON time of the motor.

Some film auto wind-up devices perform control using a deceleration curve like in the above-mentioned apparatus, as proposed in, e.g., Japanese Patent Application No. 63-027903 (corresponding to U.S. Pat. No. 4,878,077). In this case, the device also has a means for limiting an ON time of a motor according to a signal from a speed detection means near a target position, and the means is operated to prevent an overacceleration state.

The deceleration control using a deceleration curve is very effective as a method of precisely stopping a movable unit of, e.g., a photographing lens, a film, or the like. Acceleration attained by turning on a motor and deceleration attained by braking the motor are appropriately repeated to realize a speed along the deceleration curve. However, when the motor is turned to accelerate the movable unit near a stop position like in normal control, an overacceleration state tends to occur. A special means for, e.g., switching control to prevent the overacceleration state near the stop position must be taken, resulting in complicated control.

SUMMARY OF THE INVENTION

It is, therefore, an object of the present invention to provide a camera having a moving amount control apparatus which can precisely stop a movable unit at a target position without switching control from the beginning of control of the movable unit to the target position.

In order to achieve the above object, according to an aspect of the present invention, a camera having a movable unit comprises:

motor means for driving the movable unit;

target position storage means for storing a drive target position of the movable unit;

pulse generation means for generating pulses according to a movement of the movable unit;

means for detecting the remaining number of pulses to the target position on the basis of the pulses and the target position stored in the target position storage means;

moving speed detection means for detecting a moving speed of the movable unit on the basis of an interval of the pulses;

prediction means for predicting the number of pulses, which will be generated by the pulse generation means until the movable unit is stopped when the motor means is opened, on the basis of the moving speed detected by the moving speed detection means;

means for calculating a difference between the predicted number of pulses and the remaining number of pulses; and means for controlling the motor means by selecting, on the basis of the difference, one of motor ON means for applying a power supply voltage to the motor means, motor open means for driving the motor means by inertia without applying the power supply voltage, and motor brake means for short-circuiting the motor means to brake the motor means.

According to another aspect of a camera having a movable unit according to the present invention, there is provided a method of performing drive control of a motor in a camera comprising a movable unit which is moved to a target position according to a drive operation of the motor, pulse generation means for generating pulse in accordance with a movement of the movable unit, and moving speed detection means for detecting a moving speed of the movable unit on the basis of the pulses, comprising the steps of:

detecting the remaining number of pulses to the target position on the basis of the pulses and the drive target position of the movable unit;

predicting the number of pulses, which will be generated by the pulse generation means until the movable unit is stopped when drive control of the motor is stopped, on the basis of the moving speed detected by the moving speed detection means;

calculating a difference between the predicted number of pulses and the remaining number of pulses; and controlling the motor on the basis of the difference.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will be described below with reference to the accompanying drawings.

Figure 1:
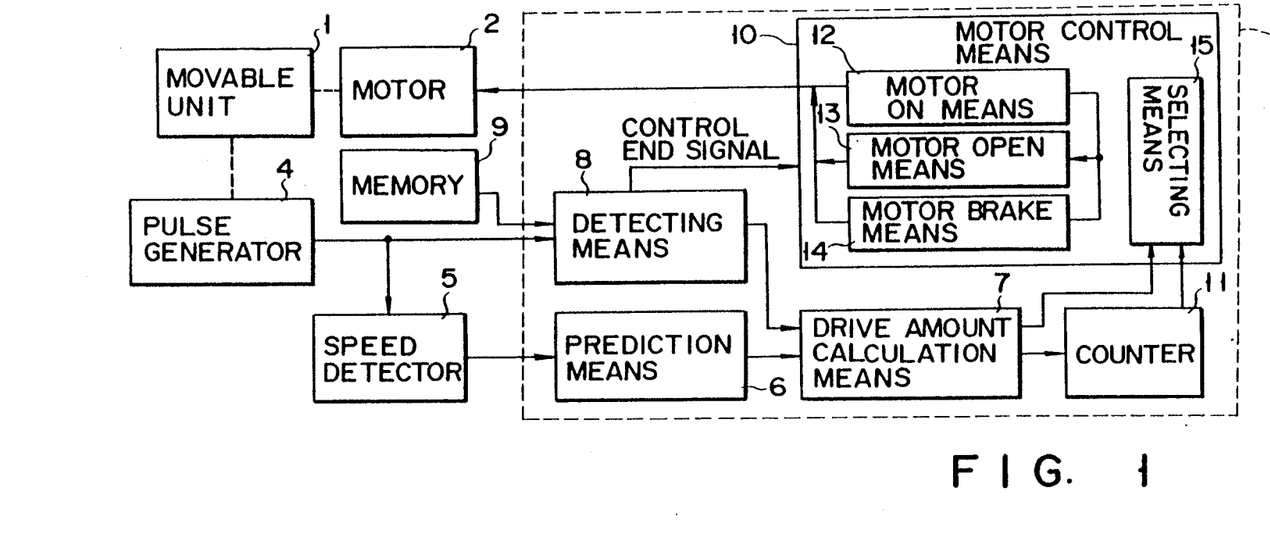
FIG. 1 is a schematic block diagram showing the first embodiment of the present invention.

FIG. 1 is a schematic block diagram showing an arrangement of a moving amount control apparatus for a camera according to the first embodiment of the present invention. In FIG. 1, a movable unit 1 is a movable portion to be controlled of, e.g., a photographing lens or a film wind-up device. The movable unit 1 is driven by a motor 2. An OFF state (first motor drive mode), an ON state (second motor drive mode), a brake state (third motor drive mode), and the like of the motor 2 is controlled in accordance with a control signal from a CPU 3.

The ON state of the motor 2 means a state wherein a power supply voltage is supplied to the motor 2, and an open or OFF state means a state wherein no voltage is supplied to the motor, i.e., the motor travels by an inertia. The brake state of the motor 2 corresponds to a short-circuited state of the motor, and means a state wherein a force in a direction opposite to the rotational direction of the motor acts by inverse electromotive force generated in the motor coils.

A pulse generator 4 comprises an encoder, and generates pulses having a period substantially proportional to a moving speed of the movable unit 1 upon movement of the unit 1. Pulses can also be generated based on the rotation of the motor 2. One output of the pulse generator 4 is output to a speed detector 5. The speed detector 5 detects a moving speed of the movable unit 1 at that time on the basis of an interval of output pulses from the encoder, i.e., by counting the number of reference clocks input during a period from the leading edge of an output pulse to the next leading edge or from the trailing edge of the output pulse to the next trailing edge. The detector 5 may count the clocks during a period from the trailing edge of the pulse to the next leading edge.

A speed signal detected by the speed detector 5 is output to a prediction means 6 in the CPU 3. Based on the speed signal received from the speed detector 5, the prediction means 6 predicts the number of pulses (predicted number of pulses) which will be generated until the movable unit 1 is stopped if the motor 2 is turned off when the movable unit 1 is moved at the detected speed. To perform prediction, the prediction means 6 can have a memory which stores in advance the relationship of prediction pulses to the speed, or the prediction is made by operation using after-mentioned equations (2), (3), and (4). The output from the prediction means 6 is supplied to a drive amount calculation means 7 in the CPU 3.

The output from the pulse generator 4 is also supplied to a direction means 8 in the CPU 3. The detection means 8 substrates the sum of pulses generated by pulse generator 4 from the number of pulses required for moving the movable unit 1 to a target position stored in a memory 9 in advance, and detects a distance to the target position at that time as the remaining number of pulses. The output from the detection means 8 is also supplied to the drive amount calculation means 7. It should be noted that the memory 9 can be omitted if the detection means 8 first receives the number of pulses representing the target position, and substraction is performed every time a pulse is output from the pulse generator 4.

The drive amount calculation means 7 calculates a difference ΔP between the predicted number of pulses, calculated by the prediction means 6, which will be generated until the movable unit 1 is stopped, and the remaining number of pulses up to the target position detected by the detection means 8, and outputs it to a motor control means 10 and a counter 11.

The motor control means 10 causes a selecting means 15 to select one of a motor ON means 12, a motor open means 13, and a motor brake means 14 on the basis of the difference ΔP calculated by the drive amount calculation means 7, thereby performing control for driving the motor 2 in a predetermined mode. The counter 11 counts a time for turning on the motor 2 or for braking it in accordance with the difference ΔP, and serves as a timer. The timing for turning on the motor 2 or for breaking it is obtained from the memory 9 in which the relationship of FIG. 4 (described later) is stored or by multiplying the coefficients of the equation on ΔP (described later).

Figure 2:
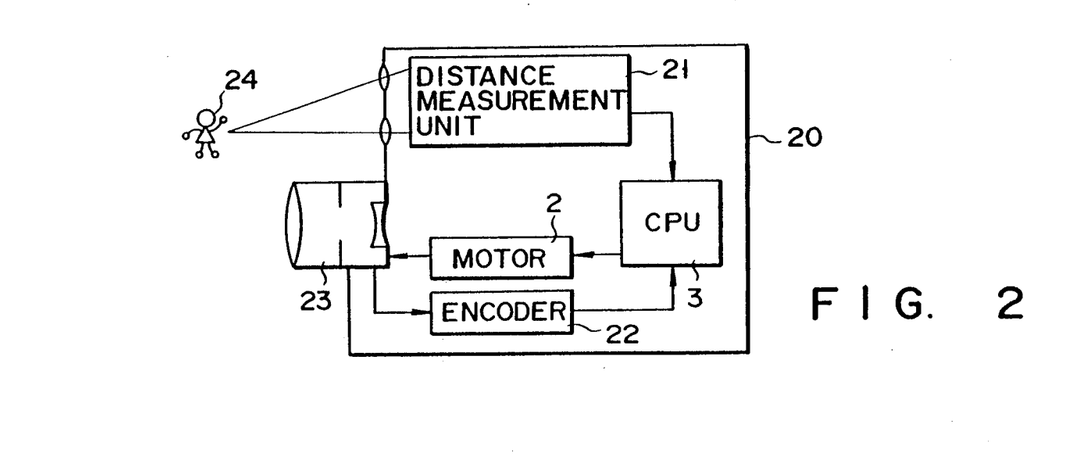
FIG. 2 is a block diagram showing the second embodiment of the present invention applied to moving control of a photographing lens.

FIG. 2 shows the second embodiment of the present invention, and is a block diagram showing a schematic arrangement obtained when the present invention is applied to moving control of a photographing lens. More specifically, a camera main body 20 includes a distance measurement unit 21, the above-mentioned CPU 3, the motor 2, and an encoder 22 as the pulse generator 4. A photographing lens 23 as the movable unit 1 is moved by the motor 2 to perform focusing.

Figure 3:
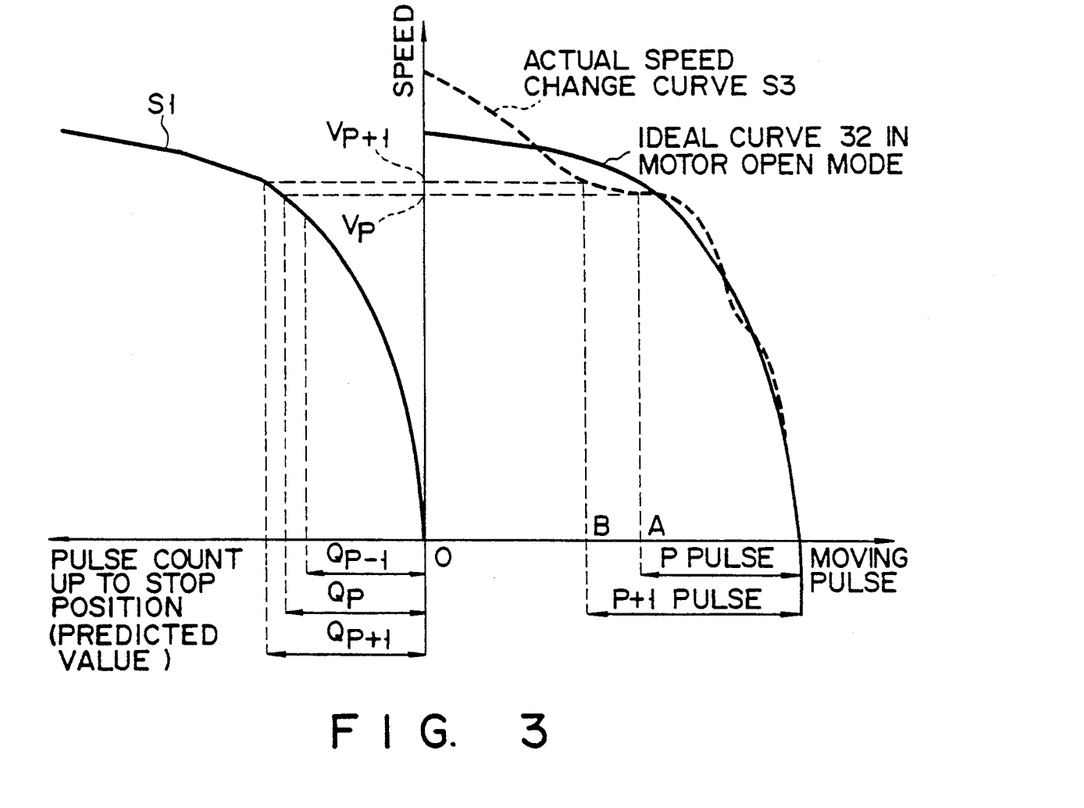
FIG. 3 is a graph for explaining an operation of the present invention.

The distance measurement unit 21 measures a distance to an object 24 by triangulation, and supplies measured distance information to the CPU 3. The CPU 3 calculates a moving amount of the photographing lens 23 as a pulse count i.e., a target pulse count, on the basis of the distance information received from the distance measurement unit 21, and stores the target pulse count in the memory 9 (FIG. 1). The CPU 3 turns on the motor 2 to start movement of the photographing lens 23. A moving speed and a moving amount of the photographing lens 23 are detected a pulse signals by the encoder 22 comprising, e.g., a photointerrupter (to be also abbreviated to as a "P.I." hereinafter), and are fed back to the CPU 3. Note that the internal functional arrangement of the CPU 3 is the same as that shown in FIG. 1 (these functions are described later using flow charts). As shown in FIG. 3, the CPU 3 causes the prediction means 6 to predict the number of pulses which will be generated until the motor is stopped if the motor is driven in a standard mode from a moving speed at that time, thus obtaining the predicted number of pulses. The CPU 3 cause the detection means 8 to detect an actual moving amount on the basis of the number of pulses generated by the encoder 22, and causes it to calculate the remaining number of pulses up to the target position. Furthermore, the CPU 3 causes the drive amount calculation means 7 to calculate a difference between the predicted number of pulses until the motor is stopped, and the remaining number of pulses up to the actual target position, thereby determining a drive amount. The motor control means 10 controls forward rotation, reverse rotation, an OFF operation, a brake operation, and the like of the motor 2 in accordance with the calculated drive amount.

Figure 5:
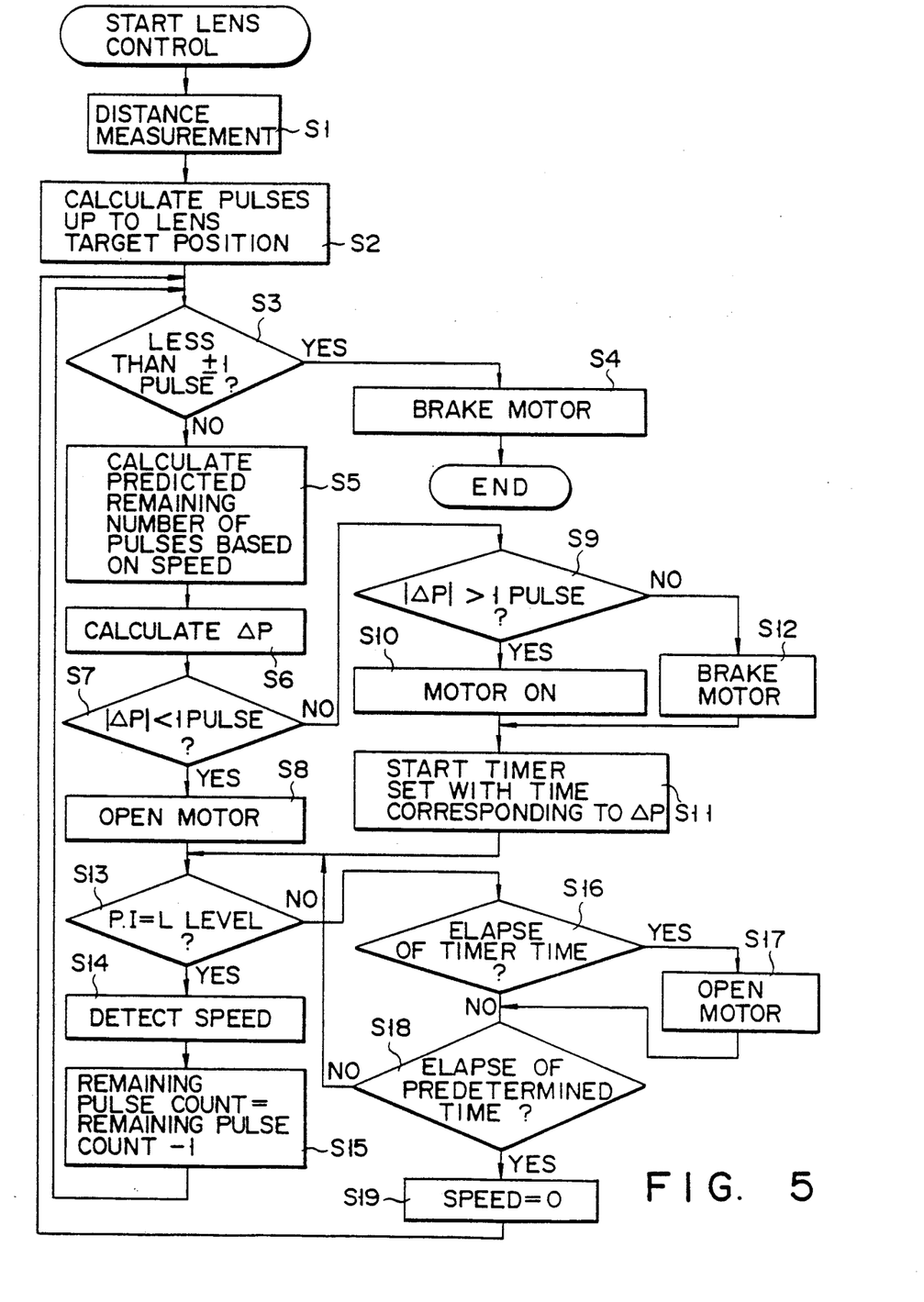
FIG. 5 is a flow chart for explaining a moving control operation of a photographing lens.

An operation of moving control of the photographing lens by the CPU 3 will be described below with reference to the flow chart shown in FIG. 5.

Assuming that the operation of the CPU 3 is started upon operation of, e.g., a release switch, the distance measurement unit 2 is operated first to perform distance measurement (step S1). The distance information obtained by the distance measurement unit 21 is supplied to the CPU 3, and a target position where the photographing lens 23 is to be moved is calculated. A moving distance between the present position and the target position is converted into the number of pulses, and the number of pulses is stored in the memory 9 (step S2). Upon completion of preparation for moving control in this manner, it is checked if the photographing lens 23 falls within a range of less than ±1 pulse of the target position (step S3). If it is determined in step S3 that the lens 23 has already fallen within the range of less than ±1 pulse of the target position, the motor 2 is not turned on, but is braked, thus ending moving control of the photographing lens 23 (step S4).

On the other hand, if it is determined in step S3 that the photographing lens 23 falls outside the range of less than ±1 pulse of the target position, the moving speed of the photographing lens 23 is detected by the speed detector 5, and a standard control mode at that speed is determined, i.e., in this embodiment, the predicted number of pulses which will be generated until the movement of the photographing lens 23 is stopped when the motor 2 is set in an open state is calculated based on a speed signal input from the speed detector 5 to the prediction means 6 (step S5). Since an initial speed is "0", an initial value of the predicted number of pulses is "0". The remaining number of pulses up to the actual target position is detected by the detection means 8 by subtracting the sum of pulses generated by the encoder 22 upon start of the movement of the photographing lens 23, from the target number of pulses to the target position stored in the memory 9 in advance. The number of pulses predicted by the prediction means 6 is subtracted from the remaining number of pulses by the drive amount calculation means 7, thereby obtaining a difference ΔP therebetween (step S6).

It is then checked in step S7 if the difference ΔP is smaller than ±1, i.e., its absolute value |P| is smaller than "1". If YES in step S7, since it is considered that the photographing lens can be stopped at the target position if the motor is opened in this state, the motor 2 is opened (step S8). On the other hand, if it is determined that the remaining number of pulses is larger than the predicted number of pulses, and the difference ΔP is larger than "+1" (first predetermined value) (step S9), since it is considered that the photographing lens will undershoot the target position, and must be accelerated, the motor 2 is turned on (step S10). In this case, an ON time of the motor 2 for stopping the lens at the target position is calculated on the basis of the difference ΔP, and is set in the counter 11. The counter 11 then starts counting (step S11).

If it is determined that the remaining number of pulses is smaller than the predicted number of pulses, and the difference ΔP is smaller than "−1" (first predetermined value), since it is considered that the lens will overshoot the target position if the motor is kept opened, and must be decelerated earlier, the motor 2 is braked (step S12). In this case, a necessary braking time is calculated on the basis of the difference ΔP, and is set in the counter 11. The counter 11 then starts counting (step S11).

In this state, the control waits until a signal from the photointerrupter P.I. constituting the encoder 22 goes to low level, or until the set timer time passes upon completion of counting the predetermined time by the counter 11. When the timer time passes, the motor 2 is set in the open state, and the control further waits until the signal from the photointerrupter P.I. goes to low level. If it is determined that the signal from the photointerrupter P.I. goes to low level (step S13), a time from the immediately preceding trailing edge of the signal from the photointerrupter P.I. is calculated, and a moving speed of the photographing lens 23 is calculated on the basis of this time (step S14). Note that the moving speed obtained is used when step 15 is executed. It is determined that the photointerrupter 23 is moved by one pulse since the trailing edge of the signal from the photointerrupter P.I. is detected, and the remaining number of pulses is decremented by "1" (step S15). The flow then returns to processing in step S3 to check if the photographing lens 23 falls within the range of less than ±1 pulse of the target position. Thereafter, the above-mentioned operations are repetitively executed. When the memory 9 is omitted, as described earlier, target pulses are generated in the detection means 8, and substraction by one is performed every time an encoder pulse is input. Therefore, the prediction at step 5 is made at each tailing edge of the P.I. signals.

On the other hand, in a state wherein the control waits for detection of the trailing edge of the signal from the photointerrupter P.I., if no trailing edge of the signal from the photointerrupter P.I. is detected yet, it is checked if the timer time has passed (step S16). If YES in step S16, the motor is opened (step S17). After the motor is opened, or if NO in step S16 and if a trailing edge of the signal from the photointerrupter P.I. cannot be detected after the lapse of a predetermined period of time (e.g., 16 ms) due to a variation or aging of a mechanism (step S18), the speed is set to be "0" (step S19), and processing from step S3 is executed. Thus, the motor 2 can be kept ON for a motor ON time required for driving the lens to the target position when the speed is "0", and moving control can be stably performed against the variation or aging of the mechanism.

A method of calculating the predicted number of pulses from the beginning of movement to its end, and a comparison method will be described in detail below with reference to FIG. 3. The relationship between a speed and the number of pulses until the lens is stopped is expressed by a curve S1, an ideal curve in the motor open mode is expressed by S2, and an actual speed change curve is expressed by S3. The curve S1 is prestored in a ROM, E²PROM, or the like as a table for storing prediction values corresponding to the speed.

First, when a simple comparison is performed, if a speed at a point A when the remaining number of pulses to the target position is P pulses is represented by $V_P$, the remaining number of pulses $Q_P$ is calculated based on the relationship S1 between the speed and the predicted number of pulses. Thus, the difference $\Delta P$ between the target number of pulses and the predicted number of pulses can be calculated by equation (1):

$$\Delta P = P - Q_P \quad (1)$$

Second, when a comparison is made by extrapolation, the remaining number of pulses $Q_P$ is calculated based on the speed $V_p$ at the point A when the number of pulses to the target position is P pulses, and a predicted number of pulses $Q_{P+1}$ is calculated on the basis of a speed $V_{P+1}$ at a point B when the number of pulses to the target position is P+1 pulses. The predicted number of pulses $Q_{P-1}$ at a point of P−1 pulses up to the target position is calculated by extrapolation using $Q_P$ and $Q_{P+1}$. When linear extrapolation is performed, equation (2) below can be adopted. Of course, an extrapolation method may be modified (e.g., parabolic extrapolation) according to characteristics of the movable unit, thus further improving controllability.

$$\begin{aligned}\Delta P &= (P-1) - Q_{P-1} \\ &= P - 1 - 2Q_P - Q_{P+1}\end{aligned} \quad (2)$$

For $Q_{P-1} = 2Q_P - Q_{P+1}$.

For $Q_{P-1}=2Q_P-Q_{P+1}$.

Figure 4:
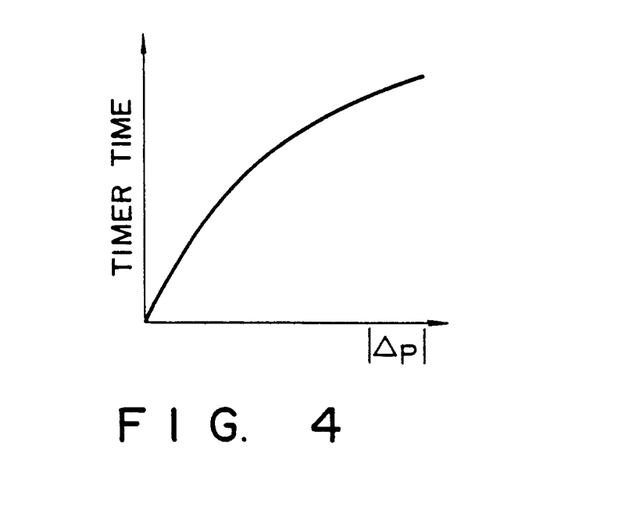
FIG. 4 is a graph for explaining the relationship between a timer time and a difference ΔP.

The relationship between the difference $\Delta P$ and the timer time is expressed by a monotonous increase relationship, as shown in FIG. 4. When $|\Delta P|$ is small, the timer time must be precise. However, when $|\Delta P|$ is larger, the timer time can be roughly determined more or less.

In this manner, the predicted number of pulses to a stop position based on the present speed and the remaining number of pulses corresponding to a distance to actually move the lens are repetitively compared, and acceleration/deceleration is repeated to perform control along the deceleration curve. Thus, an overcontrol or undercontrol state such as an overacceleration or overdeceleration state can be minimized, and the photographing lens 23 can be precisely stopped at a stop position.

The third embodiment will be described below. In this embodiment, the present invention is applied to film wind-up control and idle feed control.

Figure 6:
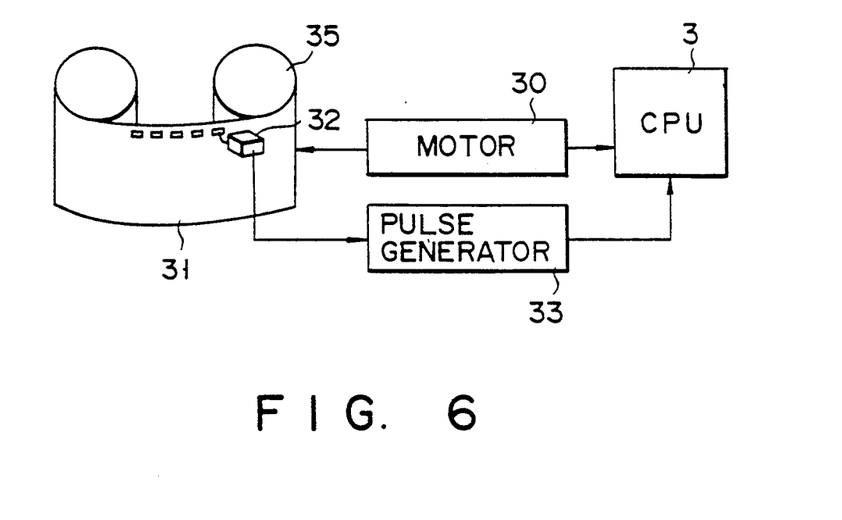
FIG. 6 is a block diagram showing the third embodiment of the present invention applied to a film wind-up mechanism.

FIG. 6 is a schematic block diagram of a film windup mechanism according to the third embodiment. A CPU 3 has substantially the same arrangement as that described in the first embodiment (FIG. 1), and a detailed description thereof will be omitted. When a film 31 driven by a motor 30 which is operated under the control of the CPU 3 is fed, perforations formed in the film are moved, and pulses are generated by a photoreflector (to be also abbreviated to as a "P.R." hereinafter) 32. These pulses are directly supplied to the CPU 3 via a pulse generator 33, and are also converted into a speed signal to be supplied to the CPU 3. Since one frame of a film corresponds to eight perforations, when the film is wound by one frame, eight pulses are generated. Similarly, when the film is idled by four frames, 24 pulses are generated. In order to further improve precision, pulses may be generated upon rotation of a sprocket 35 in place of movement of perforations so as to increase the number of pulses generated per frame.

Figure 7:
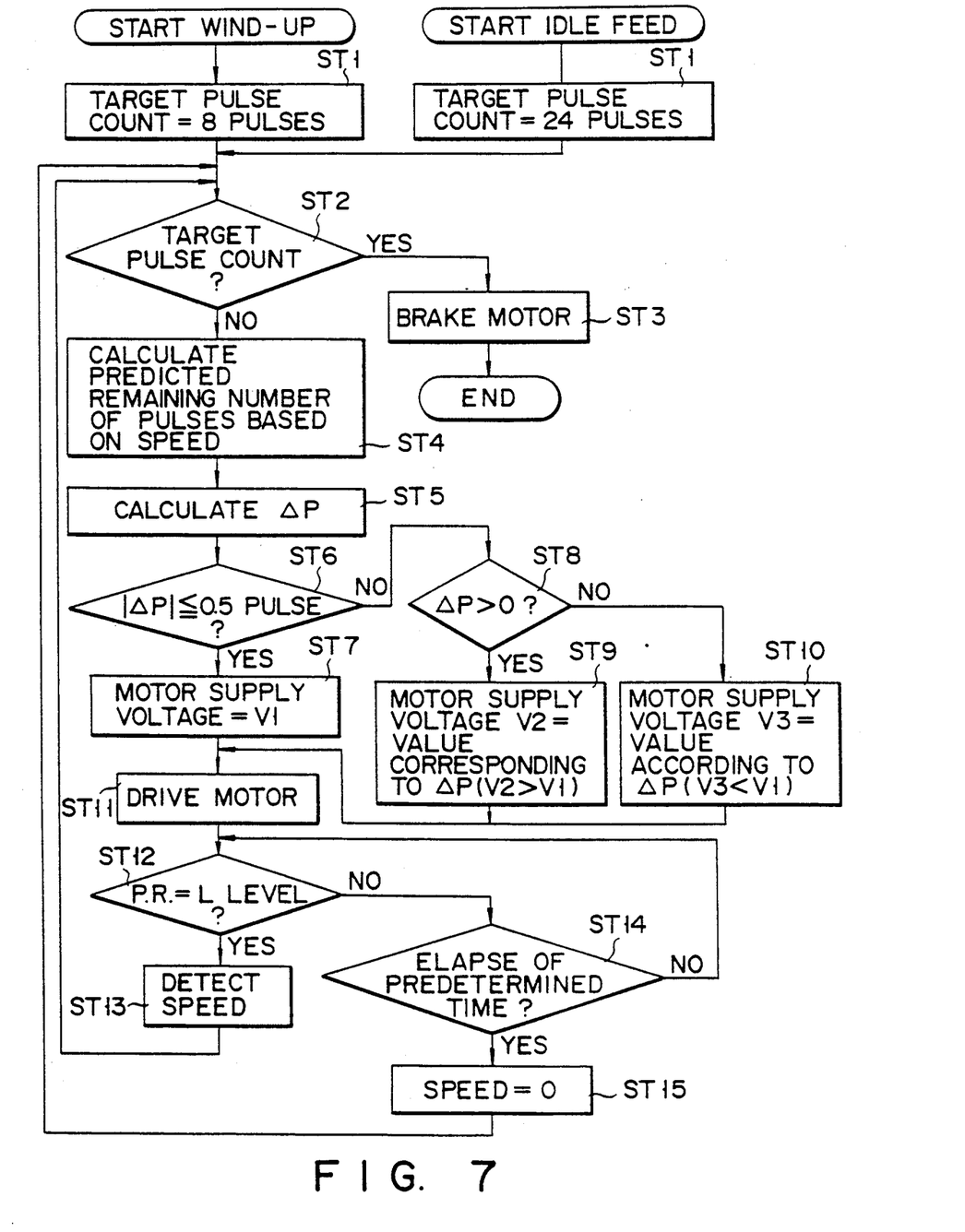
FIG. 7 is a flow chart for explaining an operation of FIG. 6.

Operations of film wind-up control and idle feed control by the CPU 3 will be described below with reference to the flow chart shown in FIG. 7.

In a one frame wind-up mode, a target pulse count is set to be "8", and in an idle feed mode, a target pulse count is set to be "24" (step ST1).

It is checked if a drive operation corresponding to the target pulse count is completed (step ST2). If YES in step ST2, the motor is braked, thus ending the film wind-up or idle feed processing (step ST3). However, if NO in step ST2, the number of pulses up to a stop position when the motor 30 is controlled at a drive voltage V1 is predicted based on a present speed (step ST4). The predicted number of pulses, as described in the second embodiment, may be simply calculated based on a speed at that time. Alternatively, extrapolation may be made based on some trial values, thus improving precision of prediction. The predicted number of pulses to the stop position is subtracted from the actual remaining number of pulses calculated in the same operations as in the first embodiment, thus obtaining a difference $\Delta P$ of pulses (step ST5). It is then checked if $|\Delta P|$ is equal to or smaller than a "0.5" pulse (step ST6). If YES in step ST6, since control can be performed as predicted, a voltage = V1 lower than a motor drive voltage is applied to drive the motor 30 in an open state (step ST11). It is checked in step ST8 if $\Delta P > 0$. If YES in step ST8, i.e., if the difference $\Delta P$ is larger than "0.5", since it is predicted that the film is stopped before the target position by $\Delta P$ pulses, a voltage V2 higher than the voltage V1 and corresponding to $\Delta P$ is obtained (step ST9), and is applied to the motor 30, thus turning on the motor to accelerate it (step ST11). Note that the voltage V2 corresponds to a power supply voltage. On the other hand, if $\Delta P$, i.e., if the difference $\Delta P$ is smaller than "−0.5", since it is predicted that the film overshoots the target position by $\Delta P$ pulses, a voltage V3 lower than the voltage V1 and corresponding to $\Delta P$ is obtained (step ST10), and is applied to the motor 30 to decelerate the motor (step ST11). The deceleration operation includes a motor braking operation. Note that the voltage V3 is 0 or a negative voltage.

The control then waits until the signal from the photoreflector (P.R.) goes to low level. It is checked if the signal from the photoreflector 32 goes to low level (step ST12). If YES in step ST12, a time between the immediately preceding trailing edge and the present trailing edge is calculated, and a speed is calculated based on this time (step ST13). The flow then returns to processing in step ST2 to check if the target pulse (step ST15). Thus, the motor 30 can be turned on by a voltage for driving it from a speed "0" to the target pulse count. Therefore, film wind-up control and idle feed control can be stably performed against a variation or aging of a mechanism.

In this case, a control object is the voltage V1 lower than a motor drive voltage, and the motor drive voltage is changed to compensate for a drive error at the voltage V1 while comparing the predicted number of pulses which will be generated when the motor is driven at the voltage V1 at the present speed and the target number of pulses.

The fourth embodiment of the present invention will be described below. In this embodiment, the present invention is applied to auto-zoom control.

Auto-zoom control refers to a mode for adjusting a focusing distance such that the occupation rate of an object in a frame is made constant. The focusing distance is calculated based on the rate and information on a distance to the object.

Figure 8:
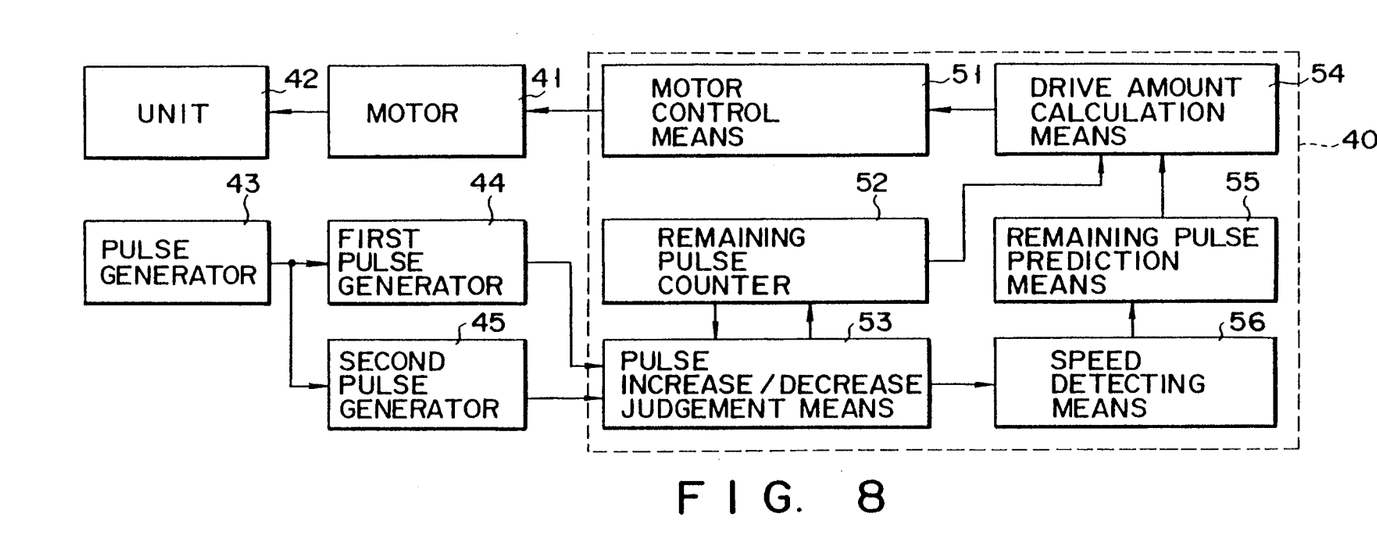
FIG. 8 is a schematic block diagram showing a control unit of an auto-zoom mechanism according to the fourth embodiment of the present invention.
Figure 9:
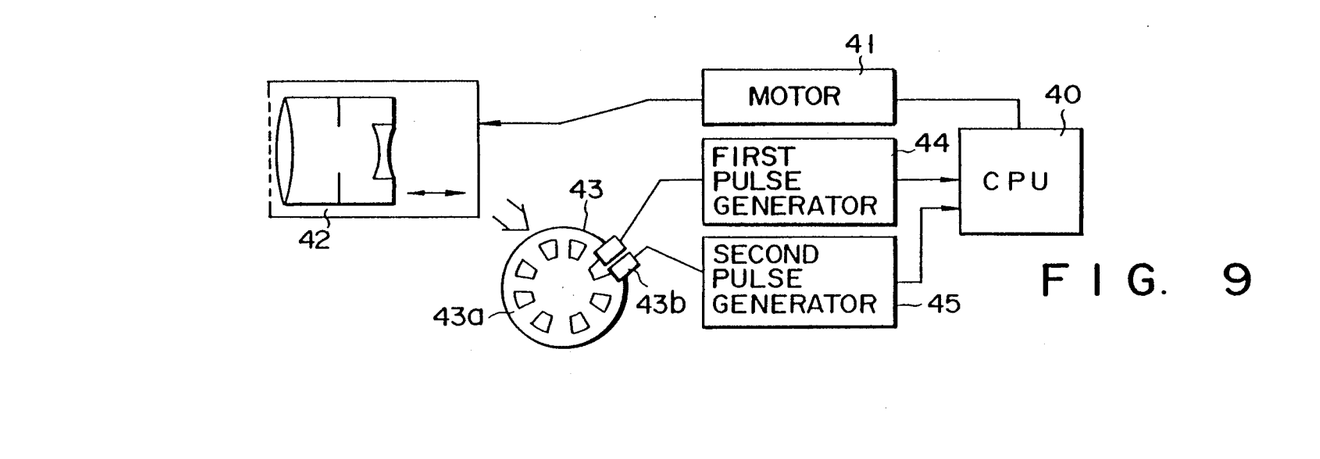
FIG. 9 is a schematic block diagram showing the auto-zoom mechanism.
Figure 10A:
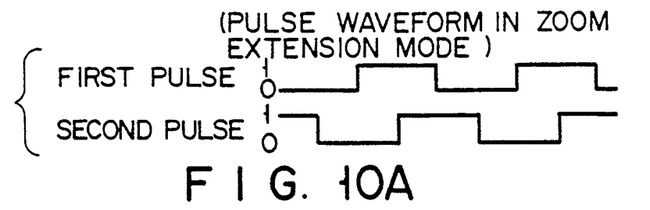
FIGS. 10A and 10B are waveform charts showing output waveforms of a photointerrupter.
Figure 10B:
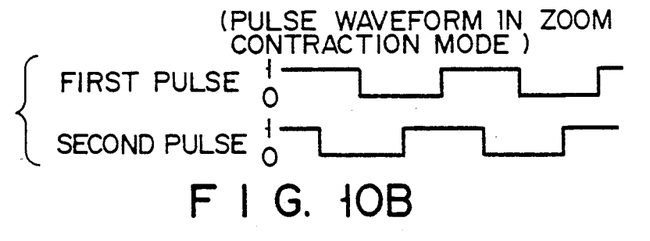
Figure 11:
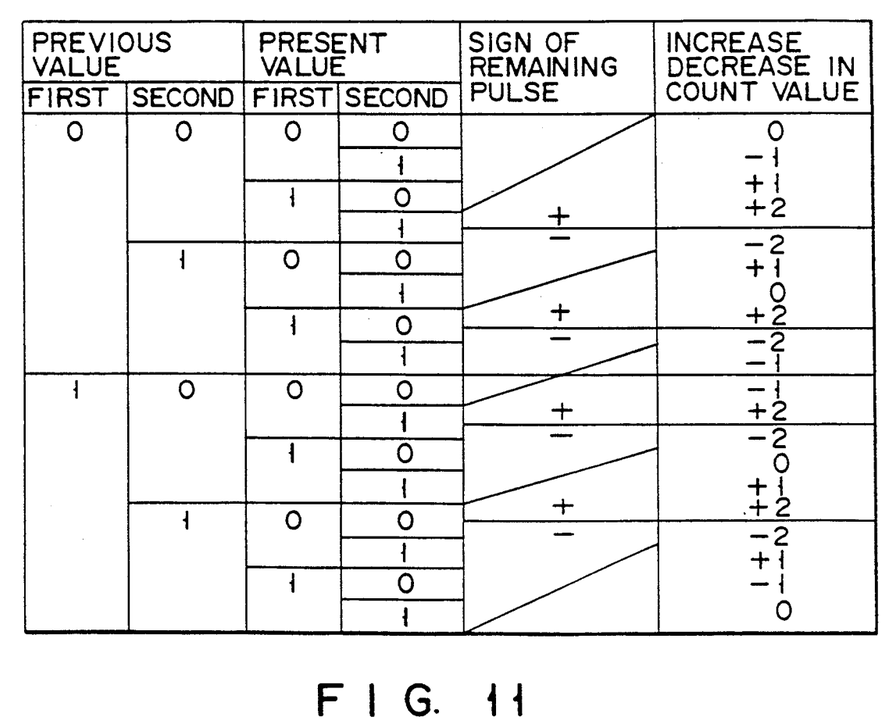
FIG. 11 is a table for explaining an auto-zoom operation.

FIG. 8 is a schematic block diagram showing a controller of an auto-zoom mechanism. In the above embodiments, the rotational direction of the motor is one direction. In this embodiment, however, the motor can be driven in two directions corresponding to tele and wide sides. As shown in the block diagram of FIG. 8, the controller has two pulse generators 44 and 45, thereby judging an increase or decrease in the number of pulses. More specifically, as shown in FIG. 9, two photointerrupters 43b are aligned along photointerrupter slits 43a. These photointerrupters generate signals having waveforms shown in FIGS. 10A and 10B according to extension or contraction of a zoom lens, and a count value is controlled to be increased or decreased using the previous value, the present value, and the sign of remaining pulses, as shown in FIG. 11.

Figure 12:
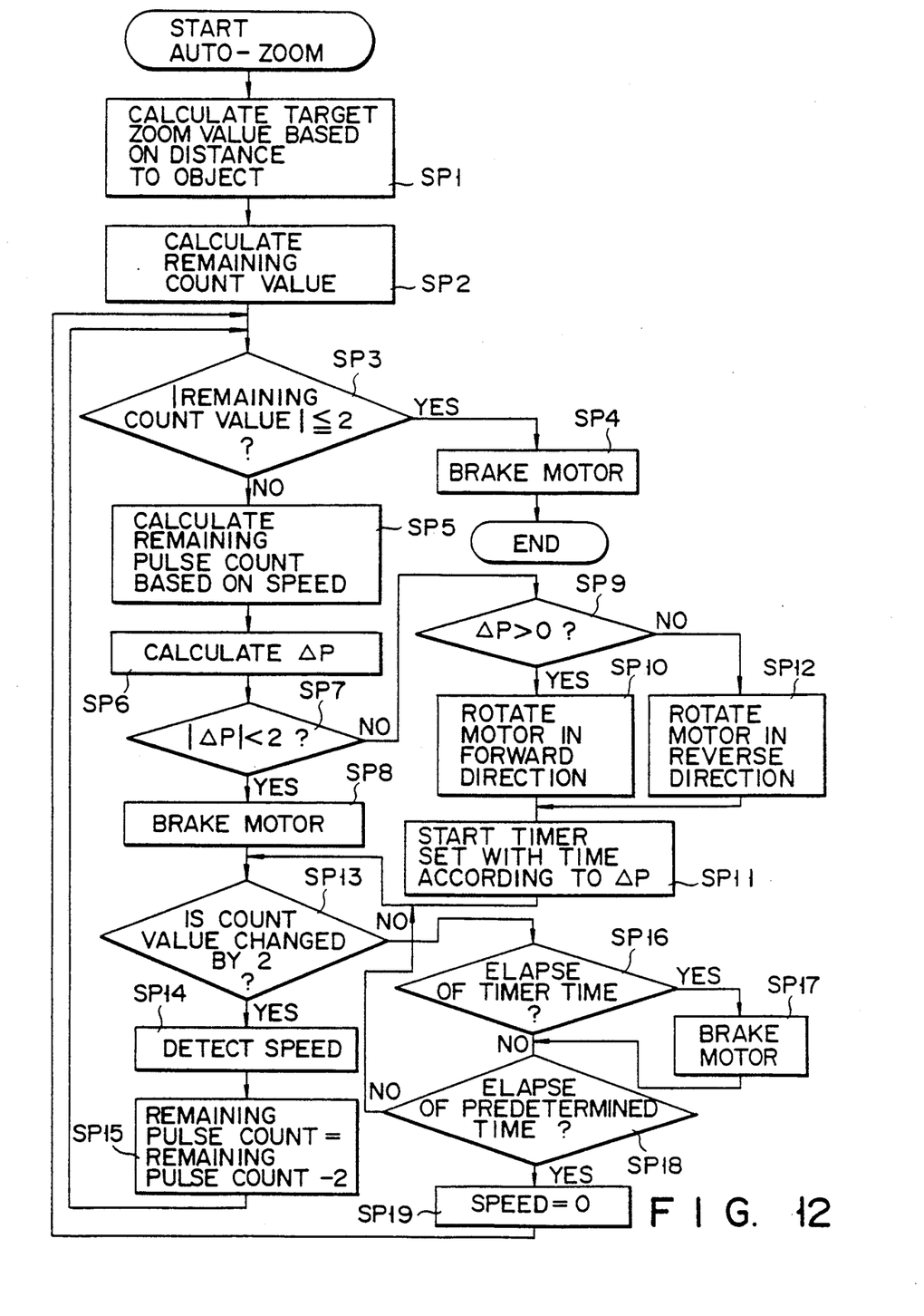
FIG. 12 is a flow chart for explaining the autozoom operation.

An auto-zoom control operation by a CPU 40 will be described below with reference to the flow chart shown in FIG. 12.

A zoom value for making a field angle constant is calculated according to a distance to an object obtained by, e.g., triangulation (step SP1). A remaining count value is calculated by subtracting a present zoom value from a target zoom value (step SP2). The zoom value is set to be "0" at a wide end, and is set to be a maximum value at a tele end. Therefore, when the lens is driven on the tele side, the remaining count value takes a positive value, and when the lens is driven on the wide side, it takes a negative value.

Upon completion of preparation for auto-zoom control in this manner, a count value is changed by 4 in one period of the photointerrupters 43b. In order to improve precision, however, it is checked if the absolute value of the remaining count value is equal to or smaller than "2", i.e., a ½ period (step SP3). If YES in step SP3, the motor is braked, and the processing is ended (step SP4). On the other hand, if the absolute value of the remaining count value is larger than "2", the necessary number of pulses up to a stop position when the motor is driven while being braked from the present speed is predicted (step SP5). A difference $\Delta P$ between the actual remaining count value and the predicted remaining count value is calculated (step SP6). It is then checked in step SP7 if the absolute value of the difference $\Delta P$ is smaller than "2". If YES in step SP7, since it can be predicted that the lens can reach the target position while being kept braked, the motor 41 is braked (step SP8). However, if the absolute value of the difference $\Delta P$ is equal to or larger than "2", it is checked if $\Delta P > 0$ (step SP9). If YES in step SP9, since it can be predicted that the lens undershoots the target position, the motor 41 is rotated in the forward direction (step SP10), and a motor forward rotation time timer for advancing the motor by $\Delta P$ pulses is started (step SP11). If $\Delta P < 0$, since it can be predicted that the lens overshoots the target position, a voltage for rotating the motor 41 in the reverse direction is applied (step SP12), and a motor reverse rotation time timer for stopping the motor $\Delta P$ pulses ahead is started (step SP11).

The count value is increased or decreased according to changes in two pulses, as shown in FIG. 11. An increase/decrease in count value is checked. That is, it is checked if the count value is changed by 2 (step SP13). If YES in step SP13, a speed is detected based on a time required for changing the count value by 2 (step SP14), and the remaining pulse count is decremented by "2" (step SP15). The flow returns to processing in step SP3 to check if the absolute value of the remaining count value is smaller than "2", and the above-mentioned operations are repetitively executed.

It is checked if a timer time has passed before the count value is changed by 2 (step SP16). If YES in step SP16, the motor 41 is braked (step SP17). After the motor is braked, or if NO in step SP16, it is checked if a predetermined period of time (e.g., 16 ms) has passed (step SP18). If NO in step SP18, step SP13 is executed; otherwise, it is determined that the zoom operation is stopped. Thus, the speed is set to be "0", and a drive operation is restarted (step SP19).

In this auto-zoom control, the movement of the zoom lens is detected by the pair of photointerrupters 43b as well as the moving direction of the lens. Even when the zoom lens is forcibly moved in a direction opposite to a motor drive direction by an external factor, e.g., by a hand during a zoom drive operation, a speed in a direction opposite to the drive direction can be detected. For example, when a forward drive operation (i.e., a tele-side drive operation) is performed, if the lens is strongly pushed to the wide side by a hand, a speed becomes a negative value, and a predicted pulse count also becomes negative although the lens is moved to the wide side. For this reason, $\Delta P$ becomes large, and a motor ON time is prolonged accordingly, thus increasing a force for driving the lens to the tele side. Thus, very stable control can be performed against an external factor.

As for the prediction means for predicting the number of pulses up to a stop position and the drive amount calculation means, which largely influence the precision of the present invention, a simple method has been described with reference to FIG. 3. When these means are improved to have higher precision, a variation caused by a disturbance can be easily absorbed, and high-speed feedback control can be realized. In order to realize these, a calculation method in the prediction means and the drive amount calculation means may be executed as follows:

First, a method of performing a calculation in the prediction means for predicting the number of pulses up to a stop position by calculating a weighted average of previous results will be described below with reference to FIG. 13.

If the remaining number of pulses predicted based on a speed of a movable unit whose remaining number of pulses up to a target position is n pulses is represented by n', a difference $\Delta R_n = n - n'$ can be regarded as a result of control during one pulse. If the number of pulses corresponding to an offset from a stop position obtained when the remaining number of pulses is n pulses is represented by $\Delta P_n$ from previous results, this value can be regarded as a predicted value of present control. Since it is considered that control of the present invention does not suffer much from a tendentious variation, a predicted value is calculated by a linear exponential smoothing method:

Present Predicted Value = Previous Predicted Value
+ α (Previous Result-Previous Predicted Value)

Therefore, we have equation (3):

$$\Delta P_P = \Delta P_{P+1} + \alpha(\Delta R_{P+1} - \Delta P_{P+1}) \tag{3}$$

where α is a value falling within a range of "$0 < \alpha < 1$", $\Delta P_n$ is the predicted value of an offset of the number of pulses for n pulses, and $AR_n$ is the predicted value of an offset of the number of pulses for n pulses.

Figure 13:
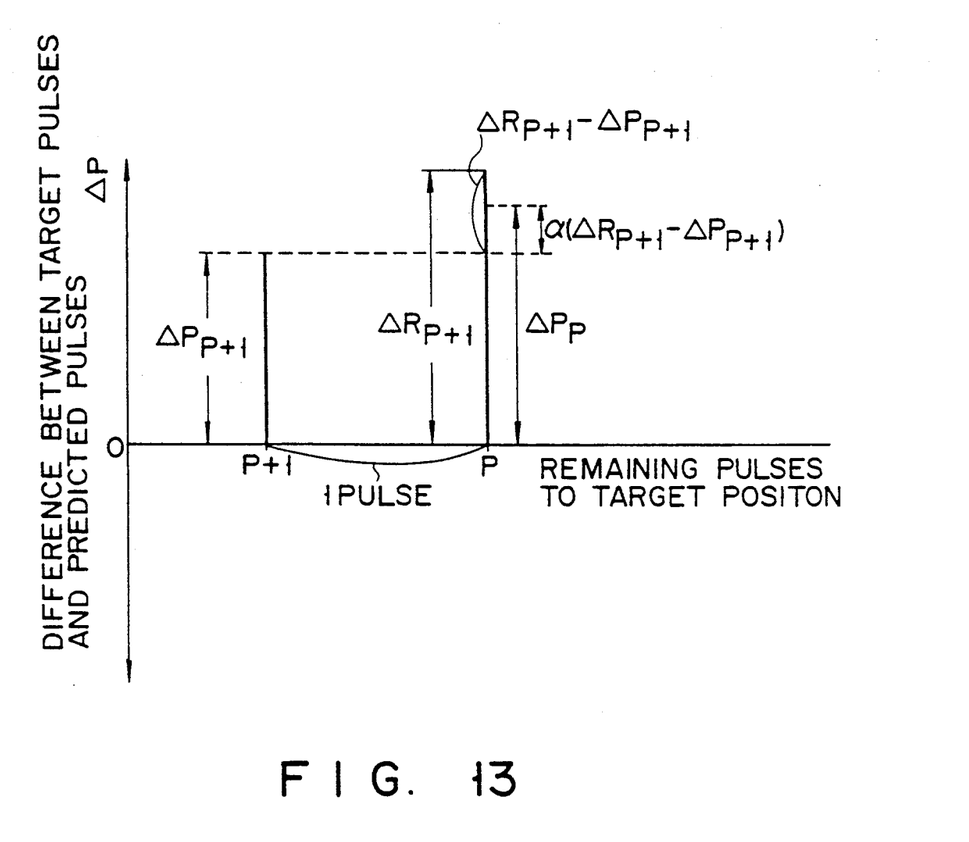
FIG. 13 is a chart for explaining another prediction method.

Respective variables are as shown in FIG. 13, and α is determined in correspondence with, e.g., control so as to be large when a variation is large, and to be small when the variation is small. Equation (3) can be developed for the previous result $\Delta R_n$ like equation (4):

$$\Delta P_p = \alpha \Delta R_{P+1} + \alpha(1-\alpha)\Delta R_{P+2} + \alpha(1-\alpha)^2 \Delta R_{P+3} \tag{4}$$

If only coefficients are extracted, equation (5) can be obtained, and $\Delta P_n$ is a weighted average of previous results since a convergence value becomes 1:

$$\{\alpha + \alpha(1-\alpha) + \alpha(1-\alpha)^2 + \alpha(1-\alpha)^3 + ....\} \tag{5}$$

Second, a method using a fuzzy controller in the drive amount calculation means for calculating a drive amount based on the predicted number of pulses corresponding to an offset from a stop position will be described below with reference to FIG. 14. This method corresponds to processing of the motor control means 10 and the counter 11 shown in FIG. 1. Refer to Japanese Patent Application No. 63-278797 for further details of a fuzzy controller.

Figure 14A:
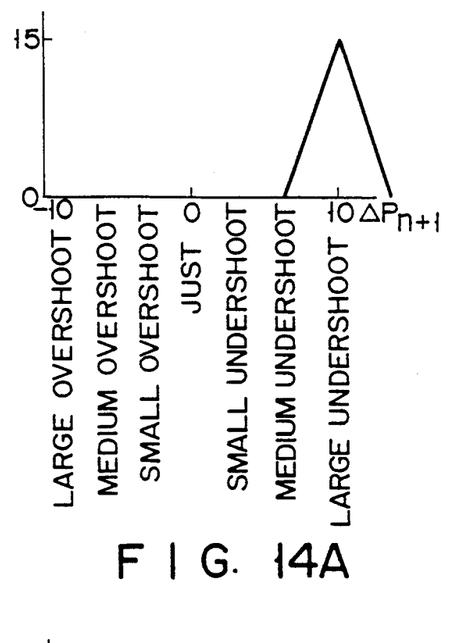
FIGS. 14A, 14B, and 14C are graphs for explaining a fuzzy control method.
Figure 14B:
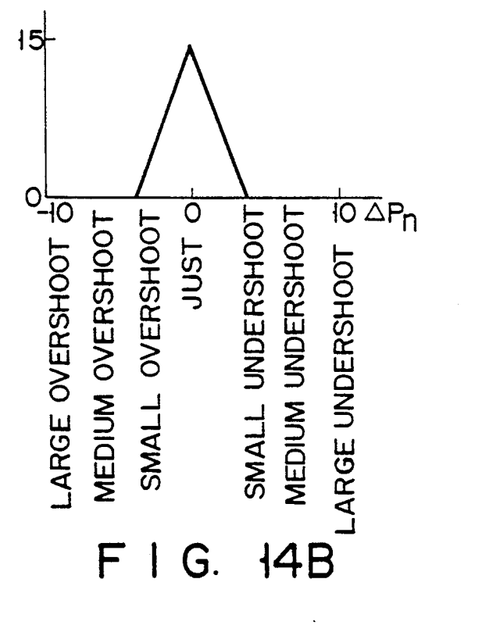
Figure 14C:
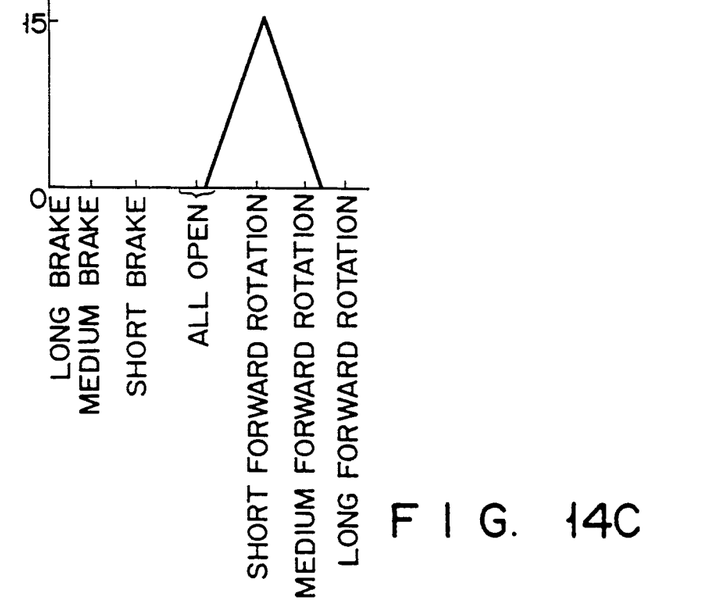

A case will be exemplified below wherein as an input to the fuzzy controller, the present predicted number of pulses $\Delta R_n$, corresponding to an offset from a stop position, output from the drive amount calculation means 7 and the previous predicted number of pulses $\Delta P_{n+1}$ (this can be stored in a memory not shown), corresponding to an offset from a stop position, output from the drive amount calculation means 7, are considered as if-part membership functions, as shown in FIGS. 14A and 14B, and as an output of the fuzzy controller, a forward rotation time or a brake time is considered as a then-part membership function, as shown in FIG. 14C. Rules of fuzzy inference are as follows:

Rules (1) If $\Delta P_{n+1}$ indicates "large overshoot" and $\Delta P_n$ indicates "large overshoot", "long brake" is performed.

(2) If $\Delta P_{n+1}$ indicates "large overshoot" and $\Delta P_n$ indicates "just", "short forward rotation" is performed.

(3) If $\Delta P_{n+1}$ indicates "large overshoot" and $\Delta P_n$ indicates "large undershoot", "long forward rotation" is performed.

(4) If $\Delta P_{n+1}$ indicates "just" and $\Delta P_n$ indicates "large overshoot", "medium brake" is performed.

(5) If $\Delta P_{n+1}$ indicates "just" and $\Delta P_n$ indicates "just", "all open" is performed.

(6) If $\Delta P_{n+1}$ indicates "just" and $\Delta P_n$ indicates "large undershoot", "medium forward rotation" is performed.

(7) If $\Delta P_{n+1}$ indicates "large undershoot" and $\Delta P_n$ indicates "large overshoot", "long brake" is performed.

(8) If $\Delta P_{n+1}$ indicates "large undershoot" and $\Delta P_n$ indicates "just", "short brake" is performed.

(9) If $\Delta P_{n+1}$ indicates "large undershoot" and $\Delta P_n$ indicates "large undershoot", "long forward rotation" is performed.

Although the above-mentioned rules are written in words, if a digital fuzzy controller is employed, they are expressed by numerical values. FIGS. 14A to 14C show examples of membership functions of the rule (2). A membership height is indicated by "0 to 15", and an input range is indicated by "−10 to +10". However, the ranges are not limited to these. An input value exceeding an input range is rounded within the input range. Note that various articles and references are available for the principle of inference, and a description thereof will be omitted here.

The prediction means for predicting the number of pulses up to a stop position can comprise a fuzzy controller, thus attaining further high-speed processing.

As described above, according to the present invention, no complicated control for discriminating whether or not a movable unit comes close to a target position while driving the movable unit to the target position, and for, when the movable unit is near the target position, changing a control method is necessary. Therefore, control can be performed by simple processing from the beginning to the end of control.

Control can be performed by the same processing regardless of a target drive direction of a motor (i.e., forward or reverse direction), and an arrangement of a controller can be simplified.

As described in detail above, according to the present invention, a camera having a moving amount control apparatus which can precisely stop a movable unit at a target position without switching control from the beginning of control of the movable unit to a target position can be provided.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A camera having a movable unit, comprising:
   motor means for driving said movable unit;
   target position storage means for storing a drive target position of said movable unit;
   pulse generation means for generating pulses according to a movement of said movable unit;
   remaining moving amount detection means for detecting the remaining number of pulses to the target position on the basis of the pulses and the target position stored in said target position storage means;
   moving speed detection means for detecting a moving speed of said movable unit on the basis of an interval of the pulses;
   prediction means for predicting the number of pulses, which will be generated by said pulse generation means until said movable unit is stopped when said motor means is opened, on the basis of the moving speed detected by said moving speed detection means;
   means for calculating a difference between the predicted number of pulses and the remaining number of pulses; and
   motor control means for controlling said motor means by selecting, on the basis of the difference, one of motor ON means for applying a power supply voltage to said motor means, motor open means for driving said motor means by inertia without applying the power supply voltage, and motor brake means for short-circuiting said motor means to brake said motor means.

2. A camera according to claim 1, wherein said motor control means selects said motor open means when it is determined on the basis of the difference between a prediction result from said prediction means and a remaining moving amount from said remaining moving amount detection means that a predicted stop position almost coincides with the target position, selects said motor brake means when it is determined based on the difference that the predicted stop position exceeds the target position, and selects said motor ON means when it is determined based on the difference that the predicted stop position cannot reach the target position.

3. A drive control apparatus for driving a movable unit of a camera by a motor to stop said movable unit at a target position, comprising:
pulse generation means for generating pulse signals upon a movement of said movable unit;
means for outputting a drive amount from a present position to the target position of said movable unit as the remaining number of pulses;
speed detection means for detecting a speed of said movable unit on the basis of an interval of the pulse signals output from said pulse generation means;
means for predicting the number of pulses, which will be generated until said movable unit is stopped when power supply to said motor is cut off, on the basis of the moving speed;
calculation means for calculating a difference between the remaining number of pulses and the predicted number of pulses; and
drive control means for, when a calculation result from said calculation means is larger than a first predetermined value, energizing said motor, for, when the calculation result is smaller than a second predetermined value, braking said motor, and for, when the calculation result falls within a range between the first and second predetermined values, cutting off power supply to said motor, thereby driving said movable unit.

4. An apparatus according to claim 3, wherein said drive control means energizes or brakes said motor for only a time according to the calculation result from said calculation means.

5. An apparatus according to claim 3, wherein said drive control means comprises means for ending drive control when the remaining number of pulses becomes equal to or smaller than a third predetermined value.

6. An apparatus according to claim 3, wherein said speed detection means determines that a speed of said movable unit is 0 when no pulse signal is generated over a predetermined period of time.

7. A camera having a movable unit, comprising:
motor means for driving said movable unit;
means for storing a drive target position of said movable unit;
pulse generation means for generating pulses according to a movement of said movable unit;
remaining moving distance detection means for detecting the remaining number of pulses to the target position on the basis of the pulses and the target position stored in said target position storage means;
moving speed detection means for detecting a moving speed of said movable unit on the basis of an interval of the pulses;
prediction means for predicting the number of pulses, which will be generated by said pulse generation means until said movable unit is stopped when said motor means is driven at a voltage lower than a minimum drive voltage, on the basis of the moving speed detected by said moving speed detection means;
means for calculating a difference between the predicted number of pulses and the remaining number of pulses; and
means for controlling said motor means by selectively applying one of a plurality of voltages to said motor means on the basis of the calculated difference.

8. A camera having a movable unit, comprising:
motor means for driving said movable unit; means for storing a drive target position of said movable unit;
pulse generation means for generating pulses according to a movement of said movable unit;
means for detecting the remaining number of pulses to the target position on the basis of the pulses and the target position stored in said target position storage means;
moving speed detection means for detecting a moving speed of said movable unit on the basis of an interval of the pulses;
prediction means for predicting the number of pulses, which will be generated by said pulse generation means until said movable unit is stopped when said motor means is braked, on the basis of the moving speed detected by said moving speed detection means;
means for calculating a difference between the predicted number of pulses and the remaining number of pulses; and
means for controlling said motor means by selecting, on the basis of the calculated difference, one of short-circuiting means for short-circuiting said motor means, forward voltage apply means for applying a forward voltage to said motor means, and reverse voltage apply means for applying a reverse voltage to said motor means.

9. A drive control apparatus for driving a movable unit of a camera by a motor to stop said movable unit at a target position, comprising:
motor drive means for driving said motor;
pulse generation means for generating pulses according to a movement of said movable unit;
means for outputting a drive amount of said movable unit to the target position as the number of pulses;
means for predicting the number of pulses which will be generated until said movable unit is stopped when a brake signal is supplied to said motor drive means;
means for calculating a difference between the number of pulses to the target position and the predicted number of pulses; and
means for, when the calculated difference falls within a predetermined range, outputting a brake signal to said motor drive means, for, when the calculated difference is larger than a first predetermined value, outputting a forward rotation signal for a predetermined period of time, and for, when the calculated difference is smaller than a second predetermined value, outputting a reverse rotation signal for the predetermined period of time.

10. A camera having a movable unit, comprising:
motor means for driving said movable unit;
pulse generation means for generating pulses according to a movement of said movable unit;
means for detecting the remaining number of pulses to the target position on the basis of the pulses and the drive target position of said movable unit;
moving speed detection means for detecting a moving speed of said movable unit on the basis of the pulses;
prediction means for predicting the number of pulses, which will be generated by said pulse generation means until said movable unit is stopped when said motor means is controlled to be stopped, on the basis of the moving speed detected by said moving speed detection means;
means for calculating a difference between the predicted number of pulses and the remaining number of pulses; and
motor control means for controlling said motor means on the basis of the calculated difference.

11. A camera according to claim 10, wherein said motor control means controls said motor means by selecting, on the basis of the difference, one of motor ON means for applying a power supply voltage to said motor means, motor open means for applying no power supply voltage to said motor means, and motor brake means for short-circuiting said motor means.

12. A camera according to claim 10, wherein said motor control means controls said motor means by selecting, on the basis of the calculated difference, one of short-circuiting means for short-circuiting said motor means, forward voltage apply means for applying a forward voltage to said motor means, and reverse voltage apply means for applying a reverse voltage to said motor means.

13. A camera according to claim 10, wherein said prediction means calculates the number of pulses using a table which stores a relationship between a speed and a predicted moving amount up to a stop position.

14. A camera according to claim 10, wherein said prediction means predicts the number of pulses by an extrapolation method using a first predicted moving amount corresponding to a previous moving speed, and a second predicted moving amount corresponding to a present moving speed.

15. A camera according to claim 10, wherein said prediction means calculates the number of pulses by a relation [previous predicted value +α(previous result previous predicted value)].

16. A drive control apparatus for driving a movable unit of a camera by a motor to stop said movable unit at a target position, comprising:
motor drive means for driving said motor;
means for generating pulses according to movement of said movable unit;
means for outputting a drive amount of said movable unit up to the target position as the number of pulses;
means for predicting the number of pulses which will be generated until said movable unit is stopped when a motor stop signal is supplied to said motor drive means;
means for calculating a difference between the number of pulses to the target position and the predicted number of pulses; and
means for supplying one control signal of a motor ON signal, a motor OFF signal, and a motor brake signal according to the calculated difference.

17. An apparatus according to claim 16, wherein the motor stop signal is the motor OFF signal or the motor brake signal.

18. A camera having a movable unit which is moved to a target position according to a drive operation of a motor, comprising:
means for generating pulses according to a movement of said movable unit;
prediction means for predicting a moving amount of said movable unit until said movable unit is stopped when said motor is subjected to stop control at a moving speed of said movable unit obtained based on the pulses; and
drive control means for performing drive control of said motor in accordance with a difference between a result from said prediction means and the target position.

19. A camera according to claim 18, wherein stop control by said prediction means is open control for cutting off power supply to said motor.

20. A camera according to claim 18, wherein stop control by said prediction means is brake control for short-circuiting said motor.

21. A camera according to claim 18, wherein said movable unit comprises an in-focus photographing lens.

22. A camera according to claim 18, wherein said movable unit comprises a focusing photographing lens.

23. A camera according to claim 18, wherein said movable unit comprises a film wind-up mechanism.

24. A camera having a movable unit which is moved to a target position according to a drive operation of a motor, comprising:
means for detecting a moving speed of said movable unit;
prediction means for predicting a moving amount of said movable unit, until said movable unit is stopped when said motor is subjected to stop control, on the basis of the moving speed of said movable unit; and
drive control means for performing drive control of said motor on the basis of a difference between a result from said prediction means and the target position.

25. A camera according to claim 24, wherein stop control by said prediction means is open control for cutting off power supply to said motor.

26. A camera according to claim 24, wherein stop control by said prediction means is brake control for short-circuiting said motor.

27. A drive control apparatus for driving a movable unit of a camera by a motor to stop said movable unit at a target position, comprising:
means for repetitively outputting a remaining drive amount of said movable unit from a present position to a target position;
means for repetitively detecting a moving speed of said movable unit;
means for predicting, on the basis of the moving speed, a moving amount of said movable unit until said movable unit is stopped when said motor is deenergized;
calculation means for calculating a difference between the remaining drive amount and the predicted stop moving amount;

means for setting a motor drive mode according to a calculation result; and motor drive means for driving said motor according to the set drive mode.

28. An apparatus according to claim 27, wherein said means for outputting the remaining drive amount includes:

means for storing a drive amount of said movable unit from an initial position to a final target position;

means for detecting a drive amount of said movable unit from the initial position to the present position; and means for calculating a difference between the stored drive amount and the detected drive amount, and outputting a calculation result as the remaining drive amount.

29. An apparatus according to claim 27, wherein said means for setting the drive mode selects one of at least three drive modes including a motor ON mode, a motor OFF mode, and a motor brake mode in accordance with the calculation result.

30. An apparatus according to claim 29, wherein said means for setting the drive mode includes time limiting means for limiting a time of the motor ON or motor brake mode in accordance with the calculation result of said calculation means.

31. An apparatus according to claim 27, wherein said means for setting the drive mode comprises a fuzzy controller for performing a fuzzy inference, and receives previous and present predicted stop moving amounts as inputs to select one drive mode from a motor ON mode, a motor OFF mode, and a motor brake mode, and to determine a control time of the selected drive mode.

32. An apparatus according to claim 27, wherein said motor drive means includes means for, when the remaining drive amount becomes equal to or smaller than a predetermined value, ending a drive control operation.

33. A method of performing drive control of a motor in a camera comprising a movable unit which is moved to a target position according to a drive operation of said motor, pulse generation means for generating pulses in accordance with a movement of said movable unit, and moving speed detection means for detecting a moving speed of said movable unit on the basis of the pulses, comprising the steps of:

detecting the remaining number of pulses to the target position on the basis of the pulses and the drive target position of said movable unit;

predicting the number of pulses, which will be generated by said pulse generation means until said movable unit is stopped when drive control of said motor is stopped, on the basis of the moving speed detected by said moving speed detection means;

calculating a difference between the predicted number of pulses and the remaining number of pulses; and controlling said motor on the basis of the difference.

34. A method according to claim 33, wherein the step of controlling said motor includes the steps of:

applying no power supply voltage to said motor when it is determined on the basis of the calculation result of the difference that a predicted stop position almost coincides with the target position;

short-circuiting to brake said motor when it is determined on the basis of the calculation result of the difference that the predicted stop position exceeds the target position; and applying a power supply voltage to said motor when it is determined on the basis of the calculation result of the difference that the predicted stop position cannot reach the target position.

35. A method according to claim 33, wherein the step of controlling said motor includes the steps of:

short-circuiting said motor when it is determined on the basis of the calculation result of the difference that a predicted stop position almost coincides with the target position;

applying a reverse voltage to said motor when it is determined on the basis of the calculation result of the difference that the predicted stop position exceeds the target position; and applying a forward voltage to said motor when it is determined on the basis of the calculation result of the difference that the predicted stop position cannot reach the target position.

36. A drive control method of driving a movable unit of a camera by a motor to stop said movable unit at a target position, comprising the steps of:

calculating a remaining drive amount of said movable unit from a present position to the target position;

detecting a moving speed of said movable unit;

predicting, on the basis of the moving speed, a moving amount of said movable unit until said movable unit is stopped when said motor is deenergized;

comparing the remaining drive amount and the stop moving amount; and accelerating or decelerating said motor according to a comparison result.

37. A camera having a movable unit which is moved to a target position according to a drive operation of a motor, comprising:

means for detecting a moving speed of said movable unit;

prediction means for predicting a moving amount of said movable unit, until said movable unit is stopped when said motor is subjected to stop control, on the basis of the moving speed of said movable unit; storage means for storing the predicted moving amount; and means for performing a fuzzy inference for control of said motor on the basis of the stored previous moving amount and a present moving amount predicted by said prediction means.

38. A camera according to claim 37, wherein an output of the fuzzy inference includes brake, open, and forward rotation modes.

* * * * *